(12) United States Patent
Yeshayahu et al.

(10) Patent No.: US 8,779,970 B1
(45) Date of Patent: Jul. 15, 2014

(54) METHOD AND APPARATUS FOR DETERMINING LOCATION USING A HYBRID SOLUTION

(75) Inventors: Yerachmiel Yeshayahu, Ra'Anana (IL); Shimeon Greenberg, Yavne (IL)

(73) Assignee: Marvell International Ltd., Hamilton (BM)

( * ) Notice: Subject to any disclaimer, the term of this patent is extended or adjusted under 35 U.S.C. 154(b) by 76 days.

(21) Appl. No.: 13/397,851

(22) Filed: Feb. 16, 2012

Related U.S. Application Data

(63) Continuation-in-part of application No. 12/944,150, filed on Nov. 11, 2010, now abandoned, which is a continuation of application No. 12/052,504, filed on Mar. 20, 2008, now abandoned.

(60) Provisional application No. 60/896,098, filed on Mar. 21, 2007, provisional application No. 60/912,551, filed on Apr. 18, 2007.

(51) Int. Cl.
*G01S 19/46* (2010.01)

(52) U.S. Cl.
USPC .................................................. 342/357.29

(58) Field of Classification Search
USPC .................................................. 342/357.29
See application file for complete search history.

(56) References Cited

U.S. PATENT DOCUMENTS

| | | | |
|---|---|---|---|
| 5,936,572 | A | 8/1999 | Loomis et al. |
| 7,257,412 | B2 * | 8/2007 | Chen et al. ............ 455/456.1 |
| 2002/0075182 | A1 | 6/2002 | Sheynblat |
| 2003/0107514 | A1 * | 6/2003 | Syrjarinne et al. ....... 342/357.06 |
| 2004/0023669 | A1 | 2/2004 | Reddy |
| 2007/0026866 | A1 | 2/2007 | Krishnamurthi et al. |
| 2008/0152034 | A1 | 6/2008 | Liu et al. |

OTHER PUBLICATIONS

Office Action issued by the United States Patent and Trademark Office on Mar. 9, 2010 for U.S. Appl. No. 12/052,504.
Office Action issued by the United States Patent and Trademark Office on Jan. 6, 2011 for U.S. Appl. No. 12/944,150.
Final Office Action issued by the United States Patent and Trademark Office on Mar. 15, 2011 for U.S. Appl. No. 12/052,504.
Office Action issued by the United States Patent and Trademark Office on Jun. 10, 2011 for U.S. Appl. No. 12/052,504.
Office Action issued by the United States Patent and Trademark Office on Aug. 19, 2011 for U.S. Appl. No. 12/944,150.

* cited by examiner

*Primary Examiner* — Harry Liu

(57) ABSTRACT

Systems and methods are provided for identifying an estimated location of a mobile device. A first wireless communication signal of a first type is received, and a second wireless communication signal of a second type is received, the second type differing from the first type. A first candidate location of the mobile device and a first accuracy metric are determined based on the first wireless communication signal, and a second candidate location of the mobile device and a second accuracy metric are determined based on the second wireless communication signal. An estimated location of the mobile device is determined based on the first candidate location, the first accuracy metric, the second candidate location, and the second accuracy metric.

16 Claims, 13 Drawing Sheets

| CONFIGURATION | BS TYPE | BS TYPE | BS TYPE | BS TYPE |
|---|---|---|---|---|
| GPS - BASIC CONFIGURATION | SATELLITE | | | SATELLITES |
| CELLULAR METHODS - BASIC CONFIGURATION | BTS | | | |
| DTV - BASIC CONFIGURATION | DTV | | | |
| WiFi - BASIC CONFIGURATION | AP | | | |
| MIX 1 | SATELLITES | SATELLITES | BTS | BTS |
| MIX 2 | SATELLITES | SATELLITES | | DTV |
| MIX 3 | SATELLITES | SATELLITES | | AP |
| MIX 4 | SATELLITES | BTS | | BTS |
| MIX 5 | SATELLITES | DTV | | DTV |
| MIX 6 | SATELLITES | AP | | AP |
| MIX 7 | BTS | BTS | | DTV |
| MIX 8 | BTS | BTS | | AP |
| MIX 9 | BTS | DTV | | DTV |
| MIX 10 | BTS | AP | | AP |
| MIX 11 | DTV | DTV | | AP |
| MIX 12 | DTV | AP | | AP |
| MIX 13 | SATELLITES | BTS | | DTV |
| MIX 14 | SATELLITES | DTV | | AP |
| MIX 15 | DTV | BTS | | AP |

Fig. 9

METHOD AND APPARATUS FOR DETERMINING LOCATION USING A HYBRID SOLUTION

CROSS-REFERENCE TO RELATED APPLICATIONS

This application is a Continuation-in-Part of U.S. patent application Ser. No. 12/944,150, filed on Nov. 11, 2010, which is a Continuation of Non-Provisional U.S. patent application Ser. No. 12/052,504, filed on Mar. 20, 2008, which claims priority under 35 U.S.C. §119(e) to provisional U.S. Patent Application No. 60/896,098, filed on Mar. 21, 2007, and further claims priority under 35 U.S.C. §119(e) to provisional U.S. Patent Application No. 60/912,551, filed on Apr. 18, 2007, the disclosure of all of which is expressly incorporated by reference herein in their entirety.

BACKGROUND

1. Field

The method and apparatus are directed generally to using multiple signal source types to determine location, and more particularly to using multiple signals source types to increase accuracy of a location determination and/or reduce power usage therewith, and/or shortening time required to make a location determination.

2. Related Art

There currently exist a number of location determination methods and apparatuses. None of these methods and apparatuses is necessarily perfect or operates in all situations. There is typically a trade-off between accuracy, power consumption, sensitivity, and cost.

For example, one common system is the Global Positioning System (GPS). The GPS system is a global navigation satellite system. It utilizes a constellation of medium earth orbit satellites that transmit precise microwave signals. These signals allow a GPS receiver to determine a position location, for example by triangulation.

GPS signals typically are transmitted at a particular frequency (about 1.575 GHz). Such a frequency may be strongly attenuated by buildings and other man made structures, or have a tendency to be affected by multi-path signals created by an urban environment or affected by inconsistencies in atmospheric conditions, for example. Accordingly, suitable GPS signals may not be always available to a GPS receiver.

Various attempts have been made to create alternatives that overcome the disadvantages of the GPS system, for example location determination employing digital television transmitters, cell phone base stations, Wi-Fi or Wi Max access points and the like. Signals from other transmitters may also not be optimal.

SUMMARY

In accordance with an embodiment of the invention, a hybrid combination of several different location processes for location determination is disclosed. The disclosed method and apparatus takes advantage of selected location determination methods to support greater reliability any time and anywhere, to calculate the position location. In an embodiment, the GPS location system may be used as the core method for location determination and the other various location systems may be used in conjunction with the GPS in a hybrid fashion. The hybrid use of several different systems facilities location determination even if one method or a portion of one method does not exist or is not available to provide a proper location. This hybrid solution may be configured to employ the system which offers the best accuracy, power consumption, and/or sensitivity or any combination of location determination methods at the platform.

There is thus provided in accordance with an embodiment of the invention a device for location determination that includes a first receiver configured to receive at least one signal from a first transmitter, a second receiver configured to receive at least one signal from a second signal transmitter, the first receiver is configured to receive a first type of signal and the second receiver is configured to receive a second type of signal different from the first type of signal, a signal quality processor configured to assess a quality of signals received by the first receiver and the second receiver, and a location calculator that determines a location of the device using the first type of signal and the second type of signal in response to a signal quality assessment.

In accordance with another embodiment of the invention, a method for location determination includes receiving at least one signal from a first transmitter, receiving at least one signal from a second transmitter, the first transmitter transmits a first type of signal and the second transmitter transmits a second type of signal different from the first type of signal, assessing a signal quality of received signals received from at least one of the first signal transmitter and second signal transmitter, and determining a location of a device using the received first and second type of signals at least from both the first transmitter and from the second transmitter.

In accordance with yet another embodiment of the invention, a device for location determination includes a first receiver configured to receive at least one signal from a first transmitter, a second receiver configured to receive at least one signal from a second signal transmitter, the first receiver is configured to receive a first type of signal and the second receiver is configured to receive a second type of signal different from the first type of signal, a signal processor configured to assess accuracy of signals received by the first receiver and the second receiver, and a location calculator that determines a location of the device using the first type of signal and the second type of signal in response to a signal assessment.

In accordance with an embodiment of the invention, a reduced power consumption wireless local area network device includes a location determination mechanism configured to determine a change in location responsive to at least one of GPS, Cellular, or television signals, the location determination mechanism uses more than one of GPS, Cellular, or television signals when one of GPS, Cellular, or television signals alone are not sufficient, and an access point selector configured to initiate an access point scan when the location determination mechanism determines a change in location.

In accordance with a further embodiment a process for reduced power consumption in a wireless local area network includes determining a change in location responsive to at least one of GPS, Cellular, or television signals, wherein the location determination uses more than one of GPS, Cellular, or television signals when one of GPS, Cellular, or television signals alone are not sufficient, and initiating an access point scan when the location determination mechanism determines a change in location.

In accordance with another embodiment, systems and methods are provided for identifying an estimated location of a mobile device. A first wireless communication signal of a first type is received, and a second wireless communication signal of a second type is received, the second type differing from the first type. A first candidate location of the mobile device and a first accuracy metric are determined based on the first wireless communication signal, and a second candidate location of the mobile device and a second accuracy metric are determined based on the second wireless communication signal. An estimated location of the mobile device is determined based on the first candidate location, the first accuracy metric, the second candidate location, and the second accuracy metric.

Additional features, advantages, and embodiments of the invention may be set forth or apparent from consideration of the following detailed description, drawings, and claims. Moreover, it is to be understood that both the foregoing summary of the invention and the following detailed description are and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate and teach embodiments of the invention. No attempt is made to show structural details in more detail than may be necessary to teach examples of various ways in which embodiments of the invention may be practiced. In the drawings:

FIG. 9 shows a chart of the possible hybrid signal combinations operating according to the principles of an embodiment;

DETAILED DESCRIPTION

Figure 1:
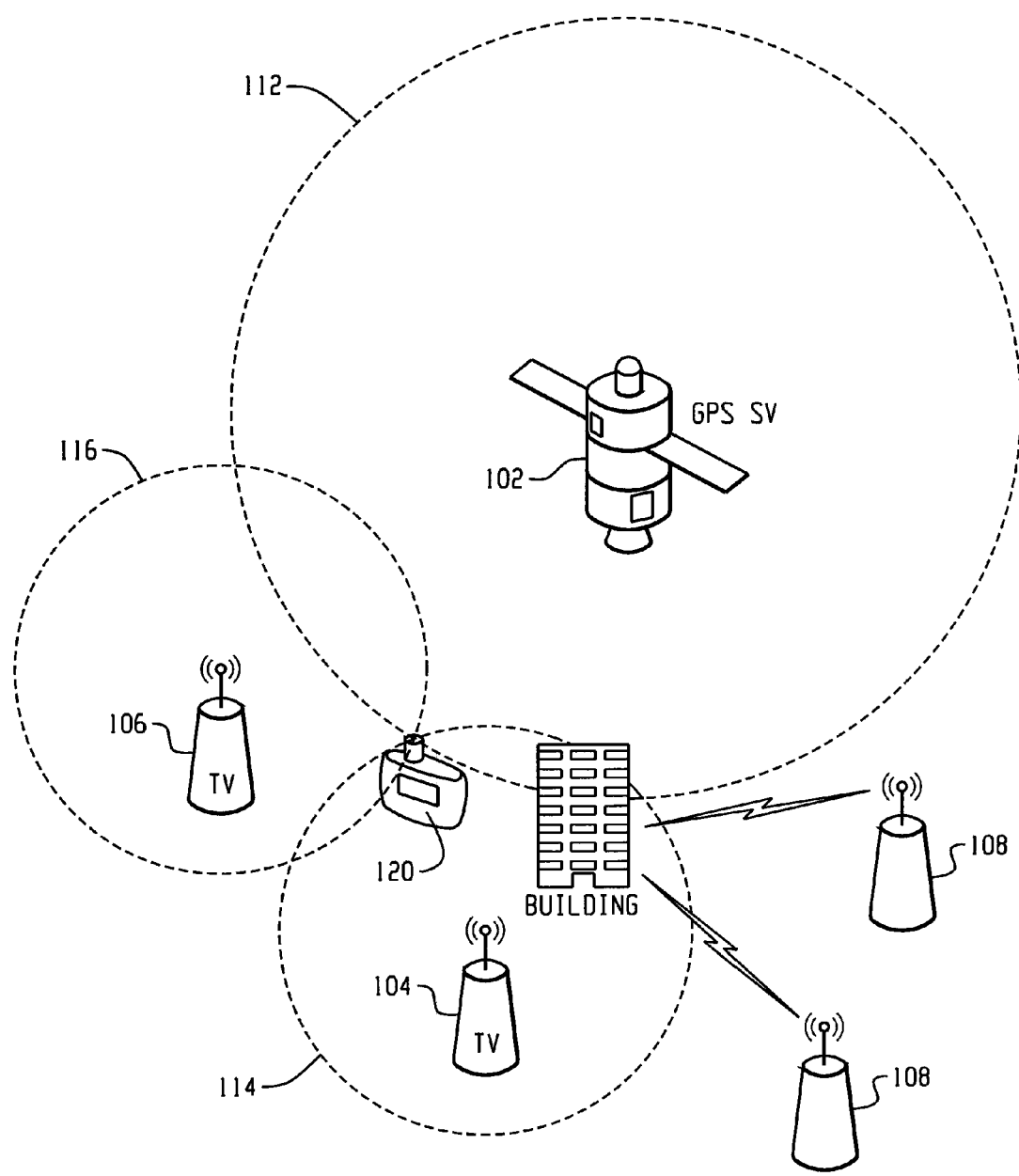
FIG. 1 shows a combination of hybrid signals used to determine location.

The embodiments of the invention and various features are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, even if not explicitly stated herein. Descriptions of well-known components and processing techniques may be omitted so as to not unnecessarily obscure teaching principles. The examples used herein are intended merely to facilitate an understanding of ways in which the invention may be practiced. Accordingly, the examples and embodiments herein should not be construed as limiting the scope of the invention, which is defined solely by the appended claims and applicable law. Moreover, it is noted that like reference numerals represent similar parts throughout the several views of the drawings.

An aspect of the invention is directed to using a hybrid combination of signals of different signal source types to determine a location of a user and/or user device. For example in FIG. 1, a GPS satellite signal source 102, a first TV signal source 104, and a second TV signal source 106 are all emitting position location signals. The GPS signal source 102 emits a GPS signal 112, the first TV signal source 104 emits a position location signal 114, and the second TV signal source 106 emits a position location signal 116. In accordance with an embodiment the combination of these signals 112, 114, 116 are used to more reliably, more efficiently, more robustly and/or in a relatively shortened period of time to locate a user and their position location device 120, for example when signals from one of the signal sources 108 are completely or partially obscured such as by a building. Although signal sources 108 are depicted as being ground based, it is appreciated that one or more of these sources may be a GPS transmitter.

Figure 2:
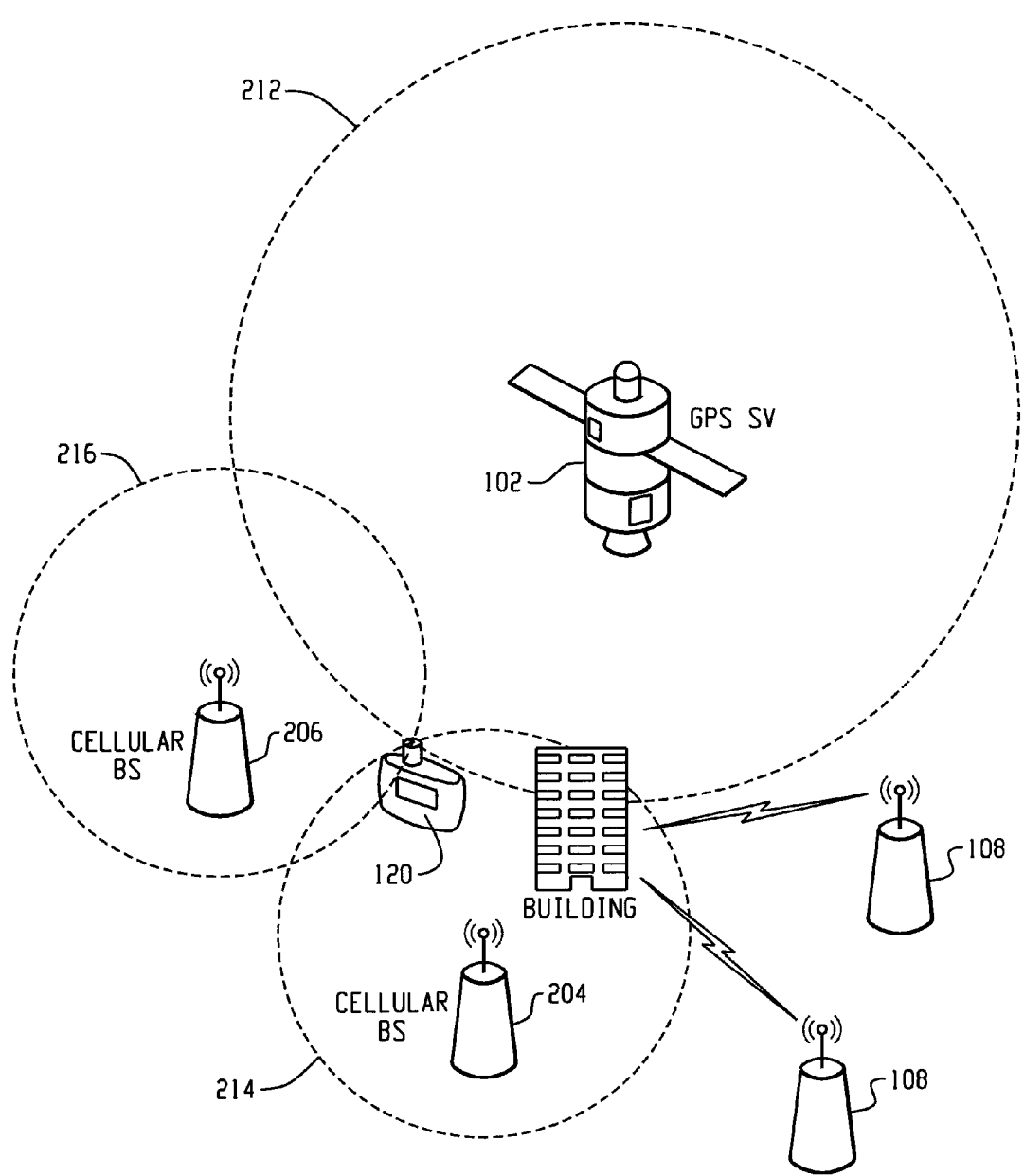
FIG. 2 shows another combination of hybrid signals used to determine location.

FIG. 2 shows another implementation of the hybrid system. In this embodiment, a GPS signal source 102 emits a position location signal 112, a first cellular based station 204 emits a position location signal 214 and a second cellular based station 206 emits a position location signal 216. Again the hybrid combination of signals is able to more efficiently, more reliably, more robustly and/or in a relatively shortened period of time determine the location of a user and their position location device 120 when signals from one of the signal sources 108 is completely or partially obscured such as by a building.

Figure 3:
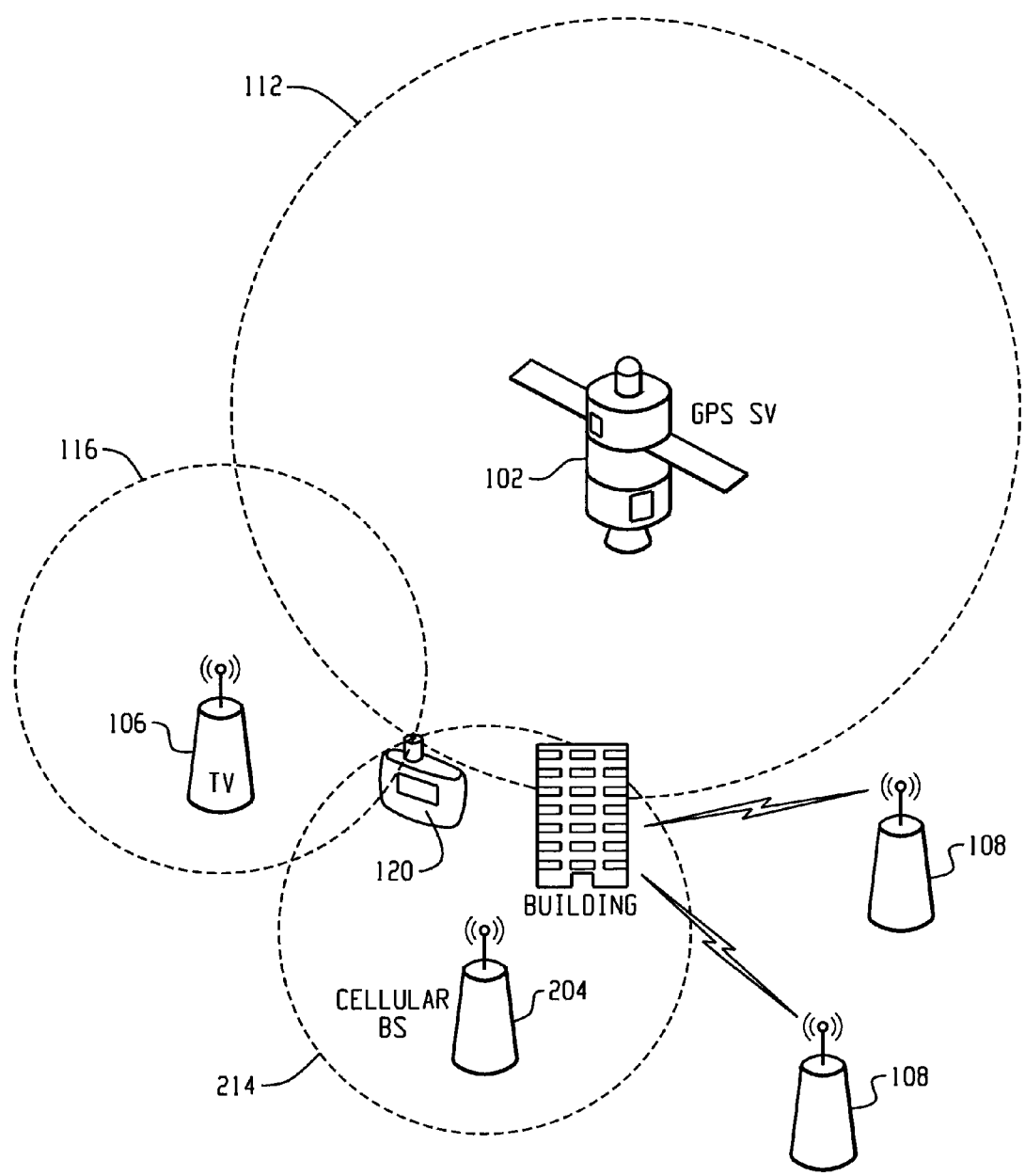
FIG. 3 shows another combination of hybrid signals used to determine location.

FIG. 3 shows another implementation of the hybrid system. In this embodiment, a GPS signal source 102 emits a position location signal 112, a first cellular based station 204 emits a position location signal 214 and a TV signal source 106 emits a position location signal 116. Again the hybrid combination of signals is able to more efficiently, more reliably, more robustly and/or in a relatively shortened period of time determine the location of a user and their position location device 120 when signals from one of the signal sources 108 is completely or partially obscured such as by a building.

In accordance with embodiments of the invention, improvements in location determination are achieved by using best signals from among those available. As shown in FIGS. 1-3, the invention may be implemented a number of different ways using a number of different types of position signals. Described in further detail below is a particular implementation of a device that is able to operate, receive and determine the location of a user in a hybrid manner using signals from different types of sources as shown in FIGS. 1-3 above. Further described below in detail is a process that may be used with the device or may be used in another device able to use a hybrid group of signals to determine the location of a user as described in reference to FIGS. 1-3 above. It should be noted that FIGS. 1-3 are merely examples of possible combinations of signals from different types of sources. Any combination of signals that are emitted from an emitter having a known location, or otherwise provide a position location reference may be used. The implementation of the above-noted functionality may be implemented with a plurality of receivers that are capable of receiving the various position determination signals. Additionally, the device may include a calculator that may be implemented to determine a location based on the plurality of the different types of signals. Finally, the apparatus may include a location signal quality processor, to determine when the signals from the plurality of receivers may be used. An apparatus that provides the above-noted functionality will now be described in detail.

Figure 4:
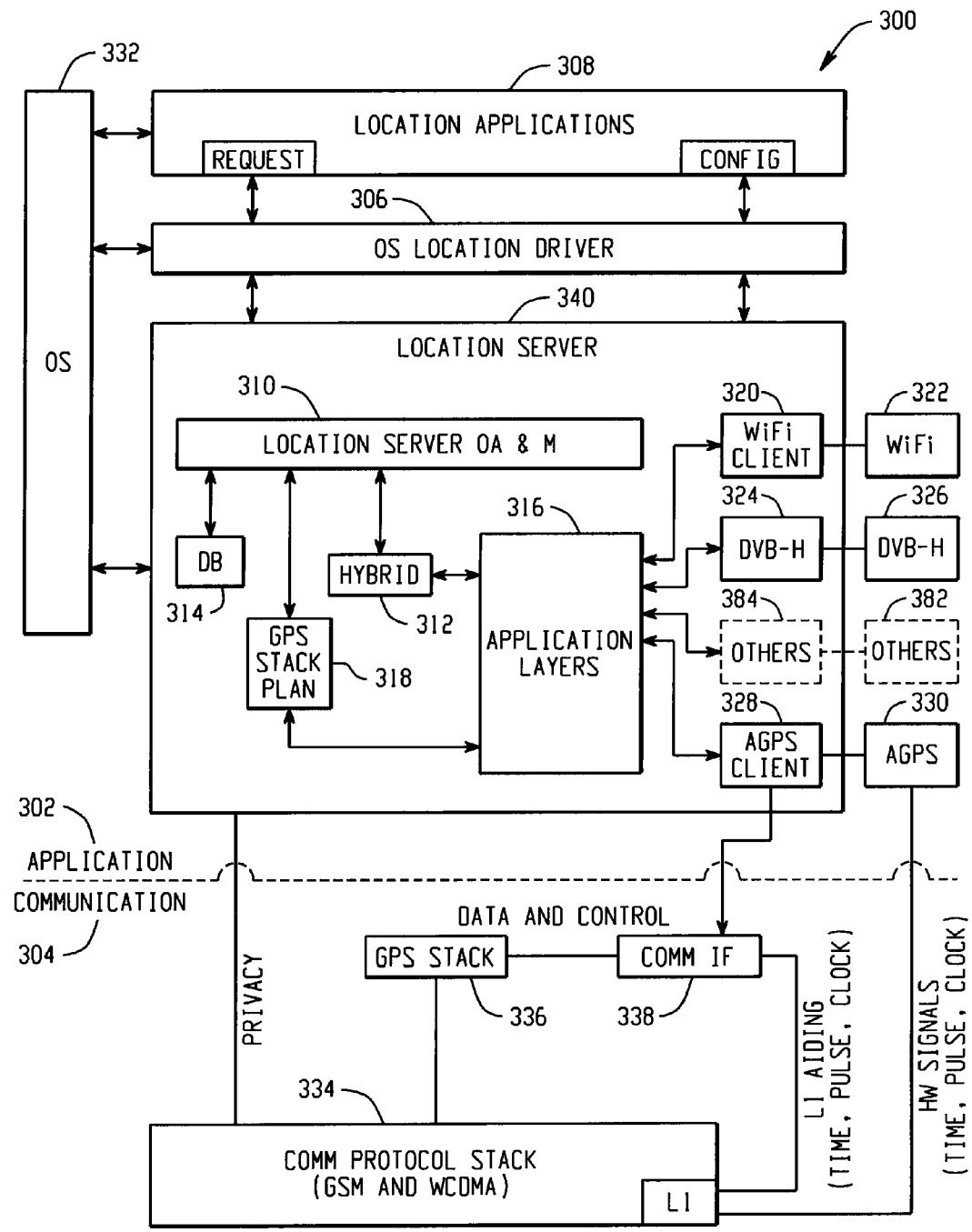
FIG. 4 shows an architecture for a processor arrangement constructed according to the principles of an embodiment.

In particular, FIG. 4 shows an example of hardware architecture 300 suitable for hybrid signal location determination. The hybrid signal location determination architecture 300 may be configured to receive signals from various different signal source types to provide location information for a user, for example. The hybrid signal location determination architecture 300 may be divided into two operational portions. As shown in FIG. 4, a first portion is an applications section 302, and the second portion is a communications section 304.

The applications section 302 may include a location server 340. The location server 340 may be connected through an OS location driver 306 (or otherwise responsive) to location applications 308. This arrangement may allow for location activities, administration, registration purposes or so on in order to improve the use of diverse location functions and to improve power consumption at an application side. The location applications 308 may include request and configuration sections to interact with the OS location driver 306. In some cases, the location server 340 may include functionality to provide for all location activities at a platform level. This may be particularly beneficial when cellular communication signals are used for location determination. And this may be more particularly beneficial when certain levels of permission are required from a cellular operator's side of operation. In this regard, permission is needed in order to use location methods controlled by a cellular network. These include cellular identification, EOTD/OTDOA, advanced GPS and a matrix applications. The location server 340 may further include a location server operations, administration, and maintenance section (OA&M) 310. The location server 340 may manage the location functionality on an application side. This is particularly true for such signal sources as advanced GPS, DVB-H, Wi-Fi and other similar location methods. The management may further be executed by the location server OA&M 310. In some particular cases, the location server OA&M 310 may manage all the location functionality at a platform level. The location server 340 may also include a hybrid block 312. The hybrid block 312 may include numerous functions including signal measurement, data & control, position calculation and so on for each of the available location signal types. Moreover, the hybrid block 312 may be able to determine position and perform a calculation from a mix of location signal types available.

The location server 340 may also include a database 314. The database 314 may be used to store various parameters. In particular, the database 314 may store location parameters such as aiding data, last location, application configurations, other measured parameters, and so on. The location server 340 may include an adaptation layer 316. The adaptation layer 316 may include functionality to coordinate various signals. The various signals may include data, control, measurements, and so on. Moreover, the various signals may be signals transmitted between the location server OA&M 310 and the hybrid block 312. The location server 340 may also include a GPS stack user plan 318. The GPS stack user plan 318 may be used to communicate with the advanced GPS client 328 amongst other things. Moreover the GPS stack user plan 318 may further utilize logic channels for data and control. The location server 340 may further include a Wi-Fi client 320. The Wi-Fi client 320 may include functionality to coordinate the communication side, the Wi-Fi stack, or the Wi-Fi stack of a control plan of a communication side with a Wi-Fi component 322.

The location server 340 may also include a DVB-H client 324, for example. The DVB-H client 324 may be used to coordinate the communication side, the DBV-H stack and/or the DBV-H stack control plan of the communications side with a DVB-H component 326.

The location server 340 may also include an AGPS client 328. The AGPS 328 may be used to coordinate the communications side, the AGPS stack for user plan on an application side, and/or an AGPS stack of a control plan on the communications side with the AGPS component 330. Any other(s) clients 384 and other(s) components 382 are contemplated for use with the invention including HDTV.

It should be noted that the hybrid block 312, the database 314, adaptation layer 316, GPS stack user plan 318, the Wi-Fi client 320, DVB-H client 324, and the AGPS client 328 may or may not be utilized in embodiments as described above. Moreover, these components may be combined as shown or located elsewhere within the system. The particular implementation noted above is merely provided as a teaching example.

Next, the hybrid signal location determination architecture 300 includes an operating system (OS) 332. The OS 332 may also be on the applications section side 302 of the hybrid signal location determination architecture 300. The OS 332 may interact with the location server 340, the operating system location driver section 306, and/or the location applications section 308.

The hybrid signal location determination architecture 300 may also include the communications section 304. The communications section 304 may interact and exchange signals with the applications section 302. In particular, the communications section 304 may include a communications protocol stack 334, for use with systems such as GSM and/or WCDMA. The communications protocol stack 334 may also interact with and/or be responsive to a GPS stack 336. The GPS stack 336 may interact with a communications interface (IF) 338. The communications interface 338 may receive data and control signals from the applications section 302. The communication interface 338 may also interface to the communications protocol stack 334 with L1 aiding, time, frequency signals and so on signaling. The communications protocol stack 334 may also provide various timing pulse, clock signals, hardware signals and so on to the advanced GPS (AGPS) component 330.

Figure 5:
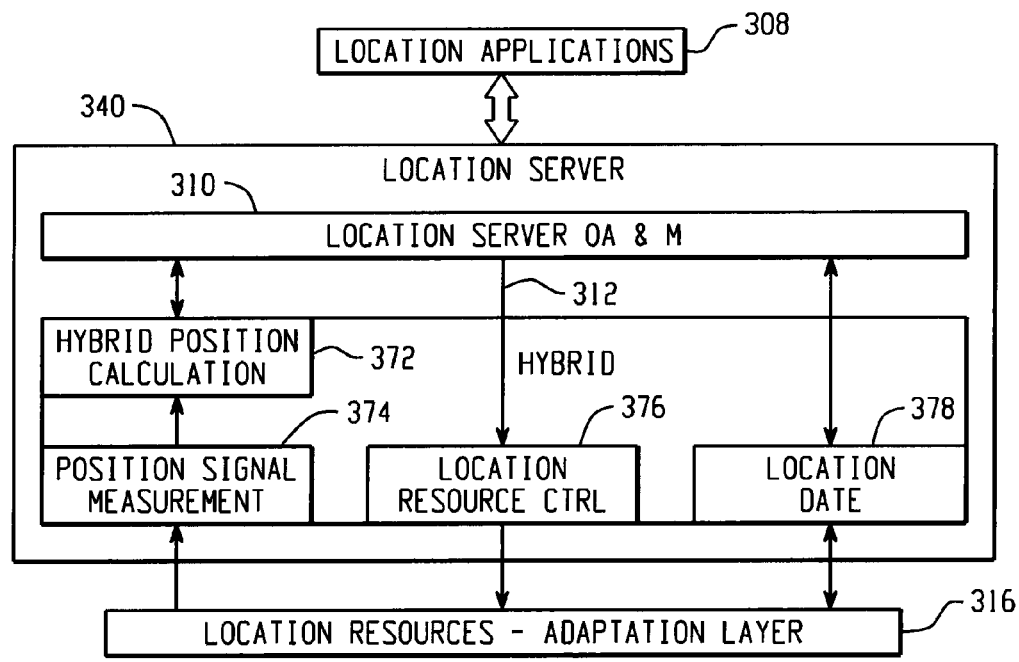
FIG. 5 shows a construction of a location server constructed according to the principles of an embodiment.

FIG. 5 shows an example of a location server constructed and arranged in accordance with an embodiment. In particular, FIG. 5 shows an implementation of the hybrid block 312 in greater detail. In this implementation, the hybrid block 312 may include a hybrid position calculation portion 372, a position signal measurement portion 374, a location resources controller 376, and a location data portion 378. In particular, the position signal measurement portion 374 may be configured to measure a timing of signals received from the various types of transmitters (GPS, HDTV, cellular, AP, etc.). The hybrid position calculation portion 372 may then be responsive to the position signal measurement portion 374 and accordingly calculate a position of the user or the mobile station responsive to the measurement determined by the position signal measurement portion 374.

Figure 6:
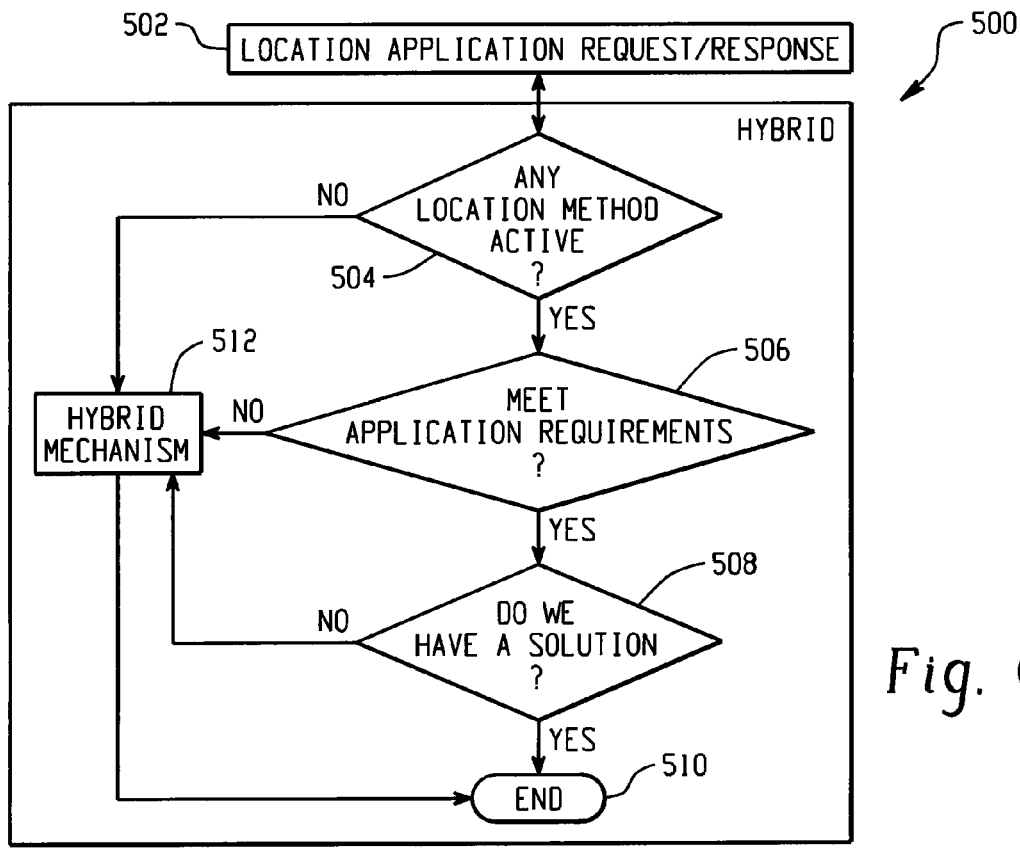
FIG. 6 shows a hybrid location determination process operating according to the principles of an embodiment.

FIG. 6 shows an example of a process that may be implemented in accordance with an embodiment of the invention.

In particular, FIG. 6 shows a hybrid location determination process 500. Initially at 502, a location application request/response 502 may be initiated from the user or as is normally initiated during operation of the mobile station. The first step is to determine whether or not any location method is currently active as shown by 504. If a location method is currently active, then the flow at logic may move to 506. In 506, a determination may be made as to whether or not the signals received meet the application requirements for determining a location. The requirements may include for example an assessment of the application requirements for position location, the signal strength of the various types of signals received in the apparatus, transmitter availability of the various signals source types, a power of the signals received in the device, and/or accuracy of the signals received into the device. This relates to precision accuracy location of the transmitter providing the signals. For example, the location of a GPS satellite may be more precisely known than the location of some signal source. Other factors may also contribute to determining whether or not particular application requirements are met.

If, as shown in 506, the application requirements are met for any selected location determination method then the logic may flow to 508. In 508, a determination may be made whether or not there is a solution to the position determination. If there is a solution, then the process may end in 510 with the determination of the position. However, if any one of the previous steps to 504, 506, 508 is negative then a hybrid solution may be sought as shown by the process in 512. Accordingly, the hybrid mechanism process 512 may be implemented in order to obtain the best possible location determination from a hybrid solution.

Figure 7:
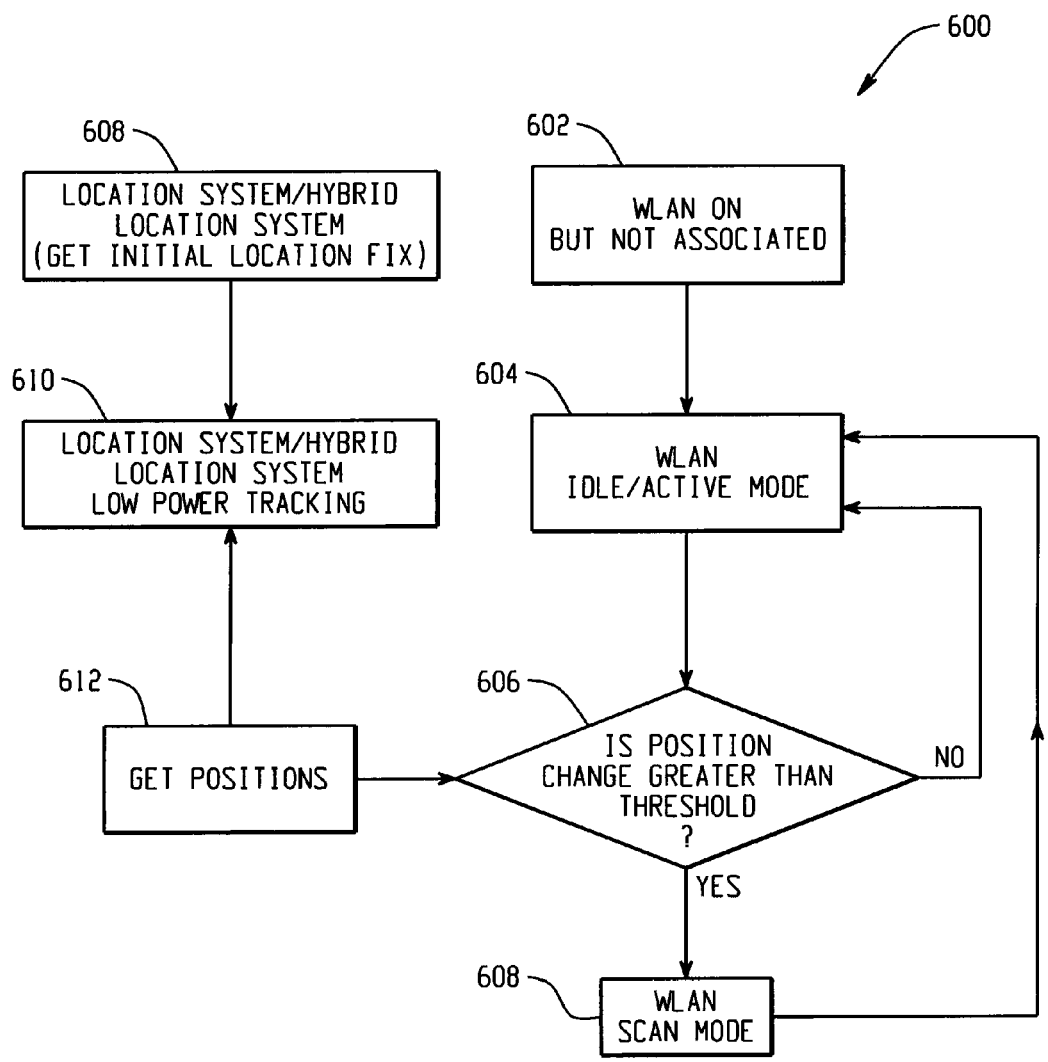
FIG. 7 shows a process to save power operating according to the principles of an embodiment.

FIG. 7 shows an example of a process for saving power in a device for location determination using hybrid signals in accordance with another embodiment of the invention. This aspect may be used in conjunction with the hybrid solution noted above or any other position location system. Further, this aspect may be used with any wireless local area network (WLAN), but other wireless systems are contemplated.

In particular FIG. 7 shows a power-saving process for mobile wireless network devices such as devices that include a WLAN transceiver, such as a mobile station that communicates with a WLAN that may implement a station scan mode. In particular, the power-saving process 600 may be utilized with or without the above-noted hybrid location process and/or apparatus. In the prior art, when a WLAN transceiver is not associated with a particular signal source, the WLAN transceiver needs to scan for new access points about every 60 seconds. Of course other timeframes are contemplated.

On the other hand, the WLAN transceiver does not need to update with a station scan mode unless it moves. Updating only in a response to a change in position based on a position determination consumes significantly less energy, and therefore increases battery life of the WLAN transceiver. During the prior art usage of a WLAN transceiver, the WLAN transceiver needed to scan about 14 channels in the 2.4 GHz band; and optionally, 12 additional channels in the 5 GHz band. For each channel, the power consumption may be about 300 mW for about 100 msec. The resultant average power consumption due to scanning every 60 seconds is therefore about 13 mW.

The power-saving process 600 may be used in conjunction with a position termination process and/or device in order to reduce the instances when the WLAN transceiver has to enter a scan mode. In particular, a WLAN station may have a typical power consumption of about 13 mW. In contrast, when a WLAN transceiver utilizes a location algorithm the power consumption may be reduced to about 28-592 μW, that results in a reduced power consumption (about 22-464 times better).

Using the power-saving process 600 shown in FIG. 7, the power consumption for position determination is in the range of about 28 to 592 μW during the same period. An example of a process using a position determination process, such as a GPS-type position determination process, in accordance with an embodiment of the disclosure will now be described with reference to FIG. 7.

In 602, a WLAN transceiver may be operating but is not associated with an access point. In 604, the WLAN transceiver transitions to an idle or active mode. At this point in time, the WLAN transceiver may be transmitting and receiving data as is well known in the art. Conventionally, approximately every 60 seconds (or other predetermined period of time) when a WLAN transceiver may be operating in an idle/active mode, the WLAN transceiver may enter a scan mode to determine signal sources and the like. However, in the power-saving process 600, unless there is a position change the WLAN transceiver may not enter a scan mode. A position change may be ascertained by using a position determination algorithm such as the hybrid system described above or some other conventional location system. For example, a location system may obtain an initial location fix as shown in 608. Thereafter, the location system may execute low power tracking as shown in 610. And thereafter, the location system may obtain a location of the WLAN transceiver as shown in 612. During the normal idle/active mode 604, the WLAN transceiver may determine whether or not there is a location change computed using signals from GPS system and the like, other hybrid sources that exceeds a position change threshold as shown in 606. This location change may be determined from the location process 612. If the location change does not exceed a threshold, then the flow of the process may return the WLAN transceiver to the idle/active mode thereby avoiding the high-power consumption scan mode as shown in 608. However, should the WLAN transceiver location be changed such that it exceeds a threshold, the flow of logic in 606 may move to 608. In 608, the WLAN transceiver may enter a scan mode in order to determine if an access point exists that provides better reception and the like.

This power-saving process may be used with a WLAN transceiver or any other type of transceiver that requires a higher power consumption mode caused by geographic movements of the device. Additionally, although a location system is referred to in the power-saving process 600, other location determination processes including the hybrid process described above are also contemplated. In particular, the power-saving process 600 may be utilized with or without the above-noted hybrid location process and/or apparatus. Moreover, other forms of sensing are contemplated to determine a change in location including accelerometers.

Figure 8:
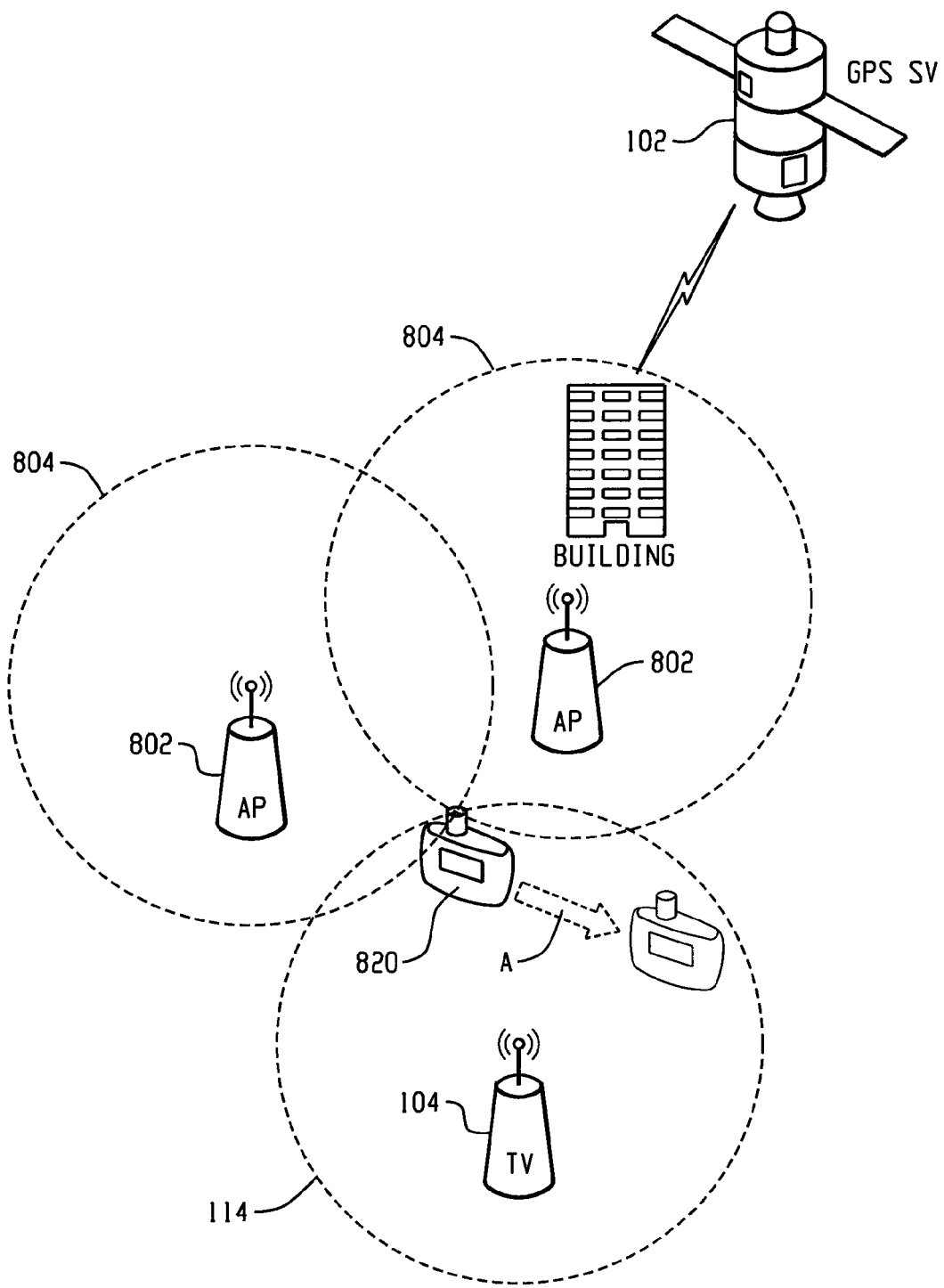
FIG. 8 shows a system for use with the FIG. 7 embodiment.

FIG. 8 shows a system for use with the FIG. 7 embodiment. In particular, FIG. 8 shows a mobile station 820 receiving signals 804 from WLAN access points 802 and TV signals 114 from a TV source 104. The GPS SV (Space Vehicle) 102 may not be able to provide a position signal. Thus, mobile station 820 may be determining location using a hybrid solution as described above. Using the process of FIG. 7, the mobile station 820 may save power by not using a scan mode until the mobile station 820 moves, as shown by arrow A, and then the scan mode may be implemented.

FIG. 9 shows a chart of the possible hybrid signal combinations operating according to the principles of the invention.

The left column shows the configuration and the right columns show the base station (BS) type. In particular, the first four rows show the basic configuration of using satellites for the GPS location determination, using base stations (BTS) cellular location determination, digital television (DTV) signals for television location determination, and Wi-Fi access points (AP) for Wi-Fi location determination. The chart of FIG. 9 further shows different possible combinations or mixes of the location determination signals. Other combinations of signals are contemplated including more than two types of signals.

Figure 10:
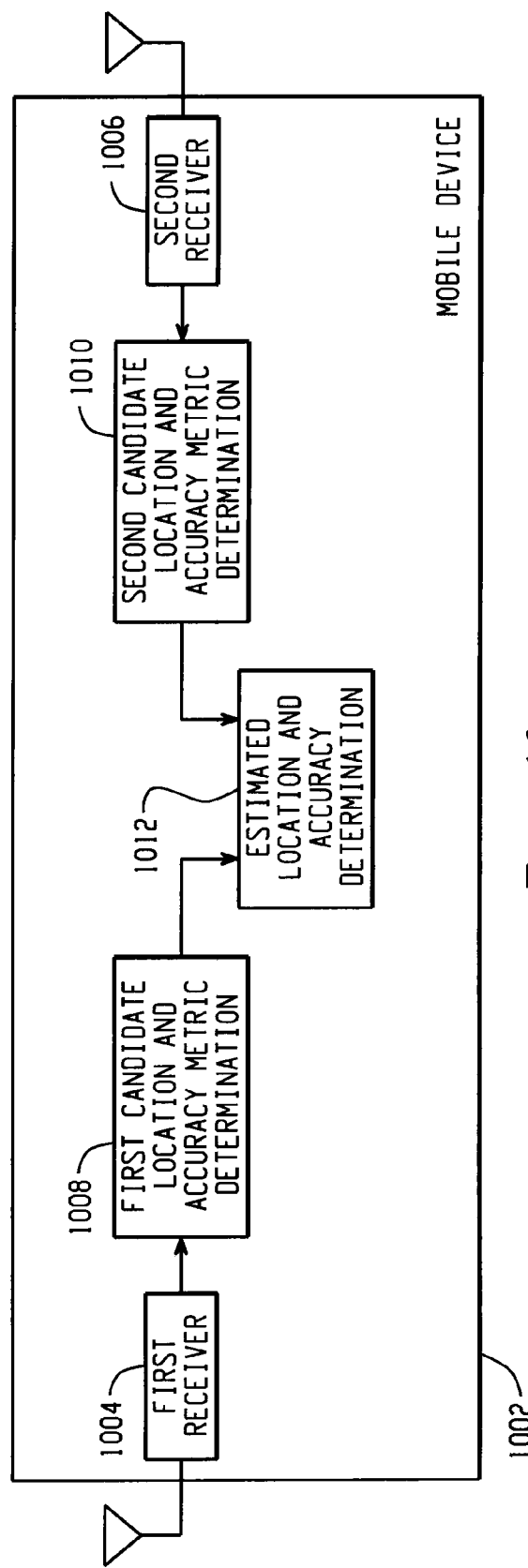
FIG. 10 is a block diagram depicting a system for identifying an estimated location of a mobile device.

FIG. 10 is a block diagram depicting an example of a system for identifying an estimated location of a mobile device 1002 in accordance with an embodiment. A first receiver 1004 is configured to receive a first wireless communication signal of a first type. A second receiver 1006 is configured to receive a second wireless communication signal of a second type. In an embodiment, the second signal is of a different type than the first signal. A processor is configured to determine a first candidate location of the mobile device 1002 and a first accuracy metric, as indicated at 1008, based on the first wireless communication signal. The processor is further configured to determine a second candidate location of the mobile device 1002 and a second accuracy metric, as indicated at 1010, based on the second wireless communication signal. At 1012, the processor is configured to determine an estimated location of the mobile device based on the first candidate location, the first accuracy metric, the second candidate location, and the second accuracy metric.

Figure 11:
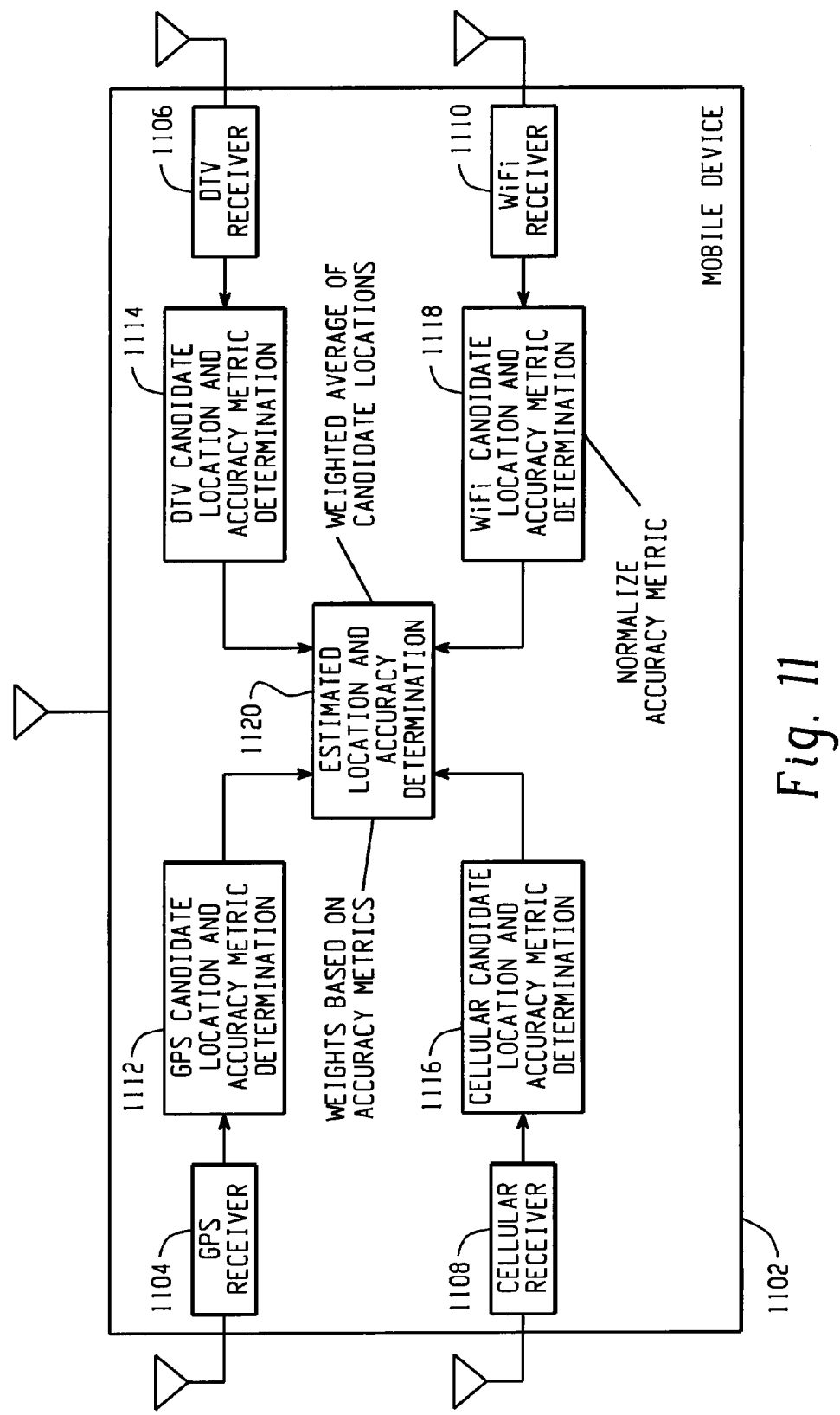
FIG. 11 is a block diagram depicting a system for identifying an estimated location of a mobile device based on multiple different types of wireless communication signals.

FIG. 11 is a block diagram depicting an example of a system for identifying an estimated location of a mobile device 1102 based on multiple different types of wireless communication signals in accordance with an embodiment. A GPS receiver 1104 is configured to receive a GPS communication signal. A digital television (DTV) receiver 1106 is configured to receive a DTV communication signal. A cellular receiver 1108 is configured to receive a cellular communication signal, and a Wi-Fi receiver 1110 is configured to receive a Wi-Fi communication signal. A processor is configured to determine a GPS candidate location of the mobile device 1102 and a GPS accuracy metric, as indicated at 1112, based on the GPS communication signal. The processor is further configured to determine a DTV candidate location of the mobile device 1102 and a DTV accuracy metric, as indicated at 1114, based on the DTV communication signal. The processor is further configured to determine a cellular candidate location of the mobile device 1102 and a cellular accuracy metric, as indicated at 1116, based on the cellular communication signal, and the processor is further configured to determine a Wi-Fi candidate location of the mobile device 1102 and a Wi-Fi accuracy metric, as indicated at 1118, based on the Wi-Fi communication signal. An estimated location of the mobile device 1102 is determined by the processor at 1120 based on the candidate locations and the accuracy metrics. For example, the estimated location may be determined based on a weighted average of the candidate locations, where the weights are based on the accuracy metrics, where accuracy metrics associated with higher quality location estimates (e.g., based on signal strengths of a received communication signal, signal strengths of multiple received communication signals, levels of signal quality metrics and/or interference noise on the respective signals, differences between a received communication signal clock and a reference clock) may result in larger weights for the associated estimated locations.

Figure 12:
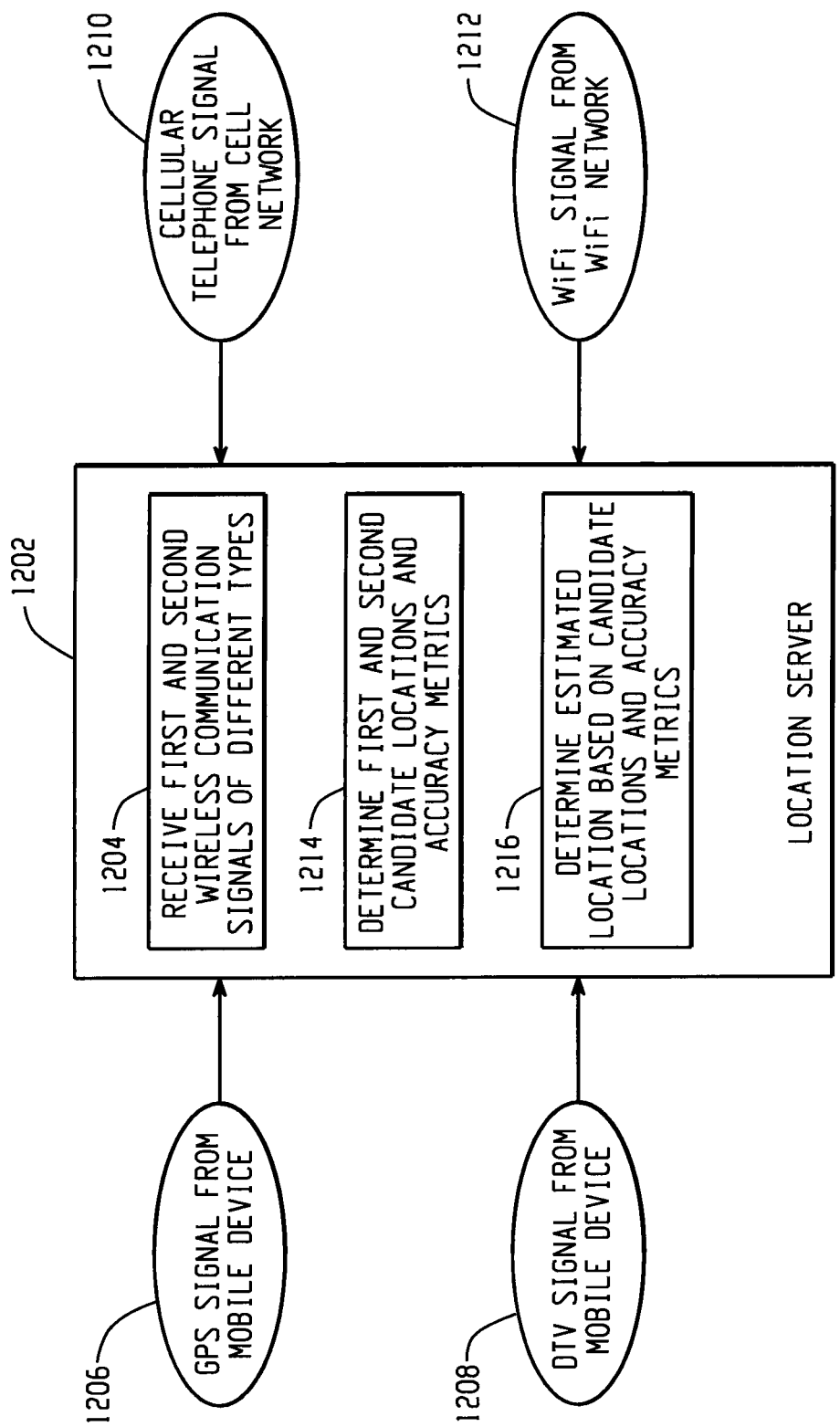
FIG. 12 is a block diagram depicting an example location server.

FIG. 12 is a block diagram depicting an example location server in accordance with an embodiment of the disclosure. A location server 1202 receives first and second wireless communication signals of different types at 1204. For example, in an embodiment, the location server may receive a GPS signal 1206 from a mobile device, a DTV signal 1208 from a mobile device, a cellular telephone signal 1210 from a cellular network, or a Wi-Fi signal 1212 from a Wi-Fi network. Based on the first and second wireless communication signals received, first and second candidate locations and accuracy metrics are determined at 1214. For example, when one of the wireless communication signals is a cellular telephone system signal, a candidate location of the mobile device is determined using a plurality of wireless communication signals of the cellular telephone signal (e.g., via triangulation), and an accuracy metric is determined based on signal strengths associated with each of the plurality of wireless communication signals. As another example, when one of the wireless communication signals is a digital television signal, a candidate location of the mobile device is determined using a difference between a time stamp of the digital television signal and a time of a reference clock, and an accuracy metric is determined based, for instance, on a signal strength associated with the digital television signal. As a further example, when one of the wireless communication signals is a Wi-Fi signal, a candidate location of the mobile device is based on a connection of the mobile device to a Wi-Fi hotspot of a known location, and an accuracy metric is determined based a signal strength associated with a connection of the mobile device to the Wi-Fi hotspot. At 1216, an estimated location is determined based on the candidate locations and the accuracy metrics (e.g., via a weighted average of the candidate locations).

Figure 13:
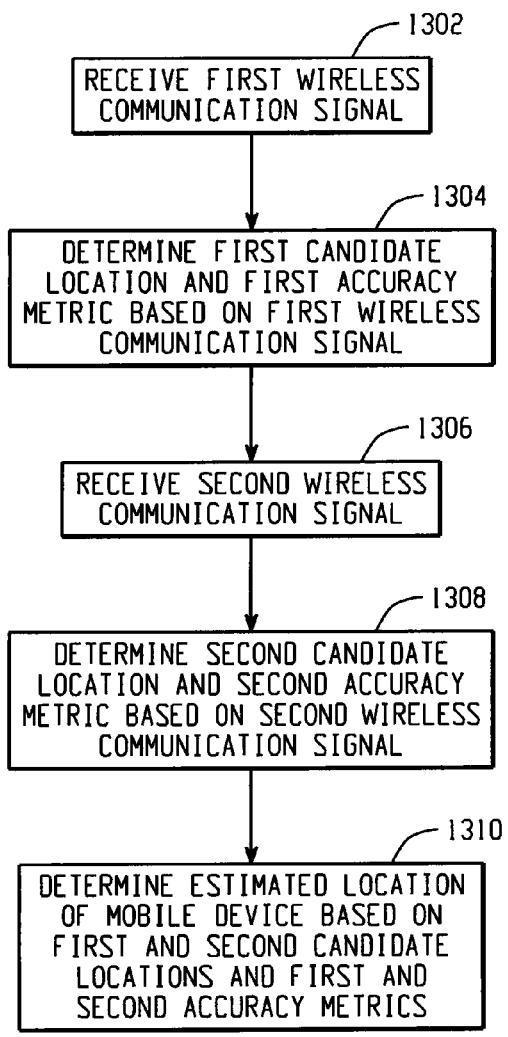
FIG. 13 is a flow diagram depicting a method of identifying an estimated location of a device.

FIG. 13 is a flow diagram depicting a method of identifying an estimated location of a device. A first wireless communication signal of a first type is received at 1302, and a first candidate location of the mobile device and a first accuracy metric are determined based on the first wireless communication signal at 1304. A second wireless communication signal of a second type is received at 1306, the second type differing from the first type. A second candidate location of the mobile device and a second accuracy metric are determined at 1308 based on the second wireless communication signal. At 1310, an estimated location of the mobile device is determined based on the first candidate location, the first accuracy metric, the second candidate location, and the second accuracy metric.

Figure 14:
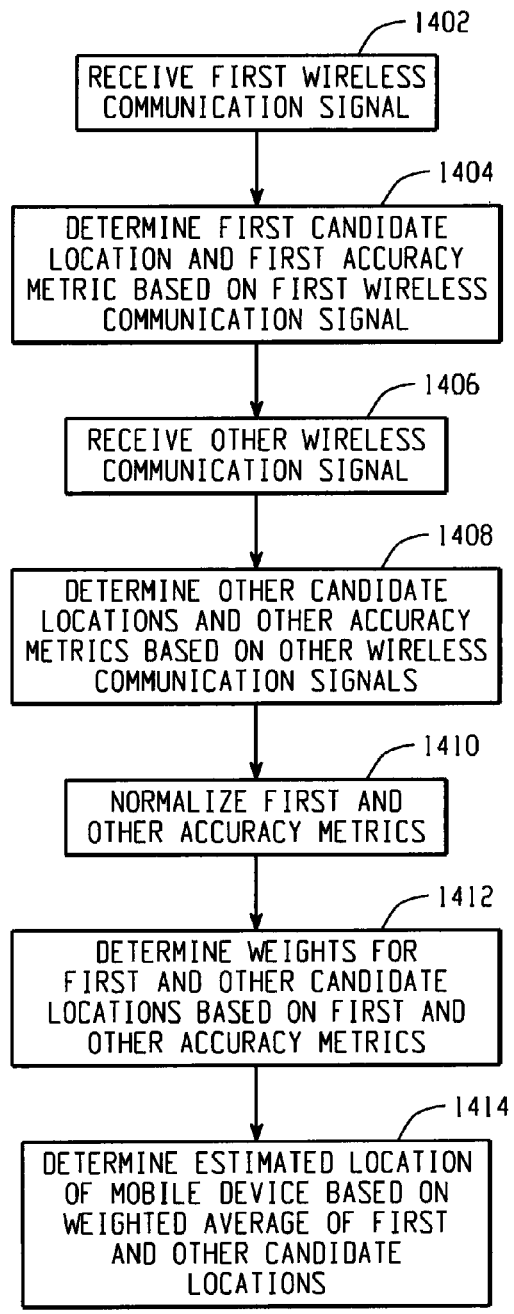
FIG. 14 is a flow diagram depicting a method of identifying an estimated location of a device based on a weighted average of candidate locations.

FIG. 14 is a flow diagram depicting a method of identifying an estimated location of a device based on a weighted average of candidate locations in accordance with an embodiment of the disclosure. A first wireless communication signal is received at 1402, and a first candidate location and first accuracy metric are determined at 1404 based on the first wireless communication signal. Another wireless communication signal is received at 1406, and another candidate location and another accuracy metric are determined at 1408 based on the another wireless communication signal. At 1410, the first and another accuracy metrics are normalized, and at 1412, weights for the first location and the another candidate location are determined based on the first accuracy metric and the another accuracy metric. At 1414, an estimated location of the mobile device is determined based on a weighted average of the first candidate location and the another candidate location.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

Figure 15:
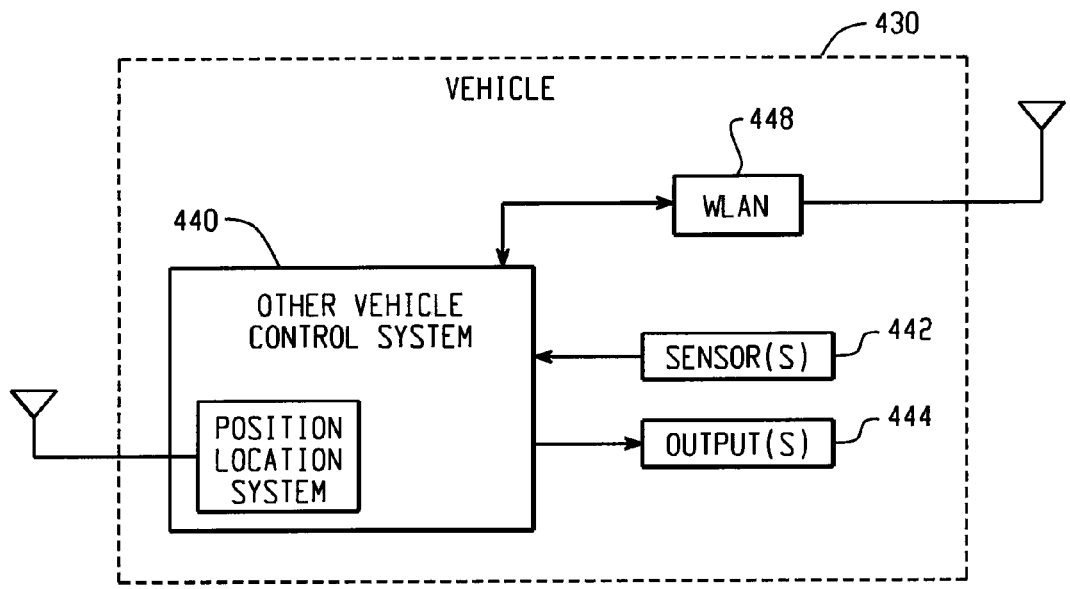
FIG. 15 shows a vehicle control system constructed according to the principals of an embodiment.
Figure 16:
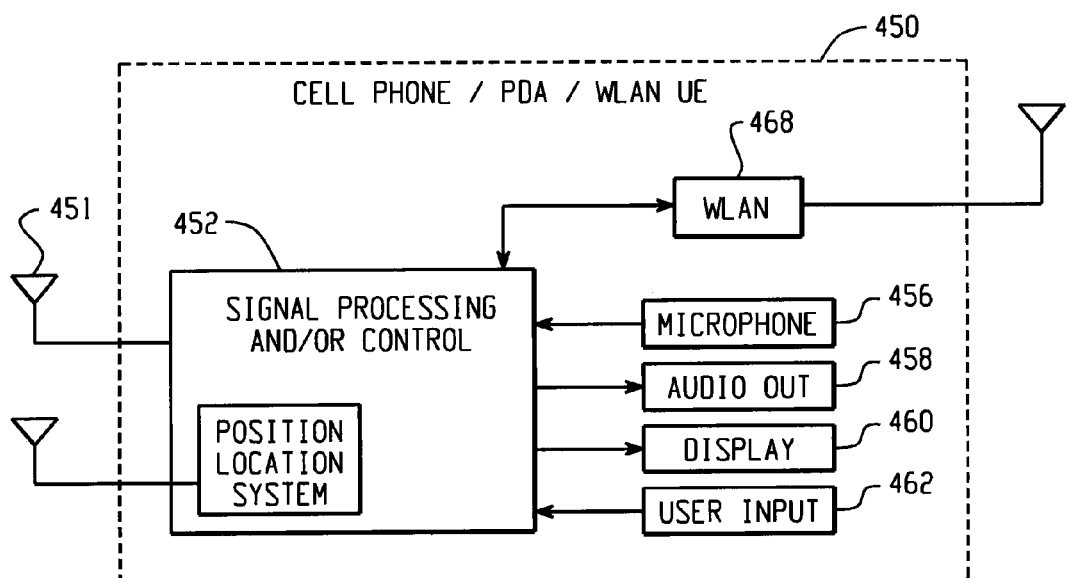
FIG. 16 shows a cellular phone/PDA/WLAN User Equipment (UE) constructed according to the principals of an embodiment.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored. Referring now to FIGS. 15 and 16 are various examples of devices in which systems and methods disclosed hereinabove may be implemented.

Referring now to FIG. 15, a hybrid system and method for location determination may be implemented in a control system of a vehicle 430.

The invention may be embodied in a control system 440 of vehicle 430. The control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated. The control system 440 may support connections with a WLAN via a WLAN network interface 448.

Referring now to FIG. 16, the hybrid system and method for location determination may be implemented in a device 450, such as a cellular phone, PDA, or WLAN UE that may include an antenna 451. The invention may implement either or both signal processing and/or control circuits, which are generally identified in FIG. 16 at 452, a WLAN interface and/or mass data storage of the device 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in the cellular phone 450 may process data, perform coding and/or encryption, perform calculations, format data and/or perform other cellular phone functions.

Although reference is made to some specific wireless protocols, any wireless protocol is within the scope of the invention. For example, Bluetooth, wireless-fidelity (Wi-Fi-IEEE 802.11), fixed wireless access (WiMAX-IEEE 802.16), ultra wideband (UWB), WCDMA (wideband code-division multiple access) or any other known technology using a licensed or unlicensed frequency band. Moreover, any future enhancement of a current protocol or any future protocol is contemplated for use with the invention.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method of identifying an estimated location of a mobile device, comprising:
   receiving a first wireless communication signal of a first type;
   receiving a second wireless communication signal of a second type, the second type differing from the first type;
   determining a first candidate location of the mobile device and a first accuracy metric based on a signal strength of the first wireless communication signal;
   determining a second candidate location of the mobile device and a second accuracy metric based on the second wireless communication signal, the second accuracy metric being of a different type from the first accuracy metric, where the second accuracy metric is associated with a feature of the second wireless communication signal other than signal strength;
   normalizing the first accuracy metric that is based on signal strength of the first wireless communication signal with the second accuracy metric of the different type from the first accuracy metric; and
   determining an estimated location of the mobile device based on the first candidate location, the normalized first accuracy metric, the second candidate location, and the normalized second accuracy metric, the estimated location being determined using a weighted average of the first candidate location and the second candidate location, where weights of the weighted average are based on the normalized first accuracy metric and the normalized second accuracy metric.

2. The method of claim 1, wherein the estimated location is calculated based on a sum of:
   a product of the first candidate location and a first weight; and
   a product of the second candidate location and a second weight.

3. The method of claim 1, wherein the first wireless communication signal is a global positioning system signal, a cellular telephone system signal, a digital television signal, or a Wi-Fi (802.11) signal, and wherein the second wireless communication signal is a global positioning system signal, a cellular telephone system signal, a digital television signal, or a Wi-Fi (802.11) signal.

4. The method of claim 1, wherein the first wireless communication signal is a cellular telephone system signal, wherein determining the first candidate location of the mobile device comprises using a plurality of wireless communication signals of the cellular telephone system, wherein the first accuracy metric is determined based on signal strengths associated with the plurality of wireless communication signals of the cellular telephone system.

5. The method of claim 1, wherein the first wireless communication signal is a digital television signal, wherein determining the first candidate location of the mobile device comprises using a difference between a time stamp of the digital television signal and a time of a reference clock, wherein the first accuracy metric is determined based on a signal strength associated with the digital television signal.

6. The method of claim 1, wherein the first wireless communication signal is a Wi-Fi signal, wherein the first candidate location of the mobile device is determined based on a connection of the mobile device to a Wife hotspot of known location, wherein determining the first accuracy metric is performed based on a signal strength associated with the connection of the mobile device to the Wi-Fi hotspot.

7. The method of claim 1, wherein determining the estimated location is performed at the wireless device or at another device.

8. The method of claim 1, further comprising calculating a third accuracy metric based on the estimated location, wherein the third accuracy metric identifies an improved accuracy of the estimated location over the first candidate location and the second candidate location.

9. The method of claim 1, wherein determining the estimated location is performed based on more than two received wireless communication signals of different types.

10. The method of claim 1, further comprising:
   determining a second estimated location of the mobile device;
   determining a distance between the first estimated location and the second estimated location; and
   generating a third estimated location of the mobile device using only of the first wireless communication signal and the second wireless communication signal when the determined distance is less than a threshold distance.

11. A system for identifying an estimated location of a mobile device, comprising:
   a first receiver configured to receive a first wireless communication signal of a first type;
   a second receiver configured to receive a second wireless communication signal of a second type, the second type differing from the first type;
   a processor configured to:
      determine a first candidate location of the mobile device and a first accuracy metric based on a signal strength of the first wireless communication signal;
      determine a second candidate location of the mobile device and a second accuracy metric based on the second wireless communication signal, the second accuracy metric being of a different type from the first accuracy metric, where the second accuracy metric is associated with a feature of the second wireless communication signal other than signal strength;
      normalize the first accuracy metric that is based on the signal strength of the first wireless communication signal with the second accuracy metric of the different type from the first accuracy metric; and
      determine an estimated location of the mobile device based on the first candidate location, the normalized first accuracy metric, the second candidate location, and the normalized second accuracy metric, the estimated location being determined using a weighted average of the first candidate location and the second candidate location, where weights of the weighted average are based on the normalized first accuracy metric and the normalized second accuracy metric.

12. The system of claim 11, wherein the first receiver is a global positioning system receiver, a cellular telephone system receiver, a digital television receiver, or a Wi-Fi (802.11) receiver, and wherein the second receiver is a global positioning system receiver, a cellular telephone receiver signal, a digital television receiver, or a Wi-Fi (802.11) receiver.

13. The system of claim 11, further comprising a transmitter configured to transmit the estimated location of the mobile device.

14. The system of claim 13, wherein the processor is further configured to calculate a third accuracy metric based on the estimated location, wherein the third accuracy metric identifies an improved accuracy of the estimated location over the first candidate location and the second candidate location, and wherein the transmitter is further configured to transmit the third accuracy metric.

15. The system of claim 11, wherein the estimated location is calculated based on a sum of:
   a product of the first candidate location and a first weight; and
   a product of the second candidate location and a second weight.

16. A computer-readable storage medium encoded with instructions for commanding one or more data processors to execute a method of identifying an estimated location of a mobile device, the method comprising:
   receiving a first wireless communication signal of a first type;
   receiving a second wireless communication signal of a second type, the second type differing from the first type;
   determining a first candidate location of the mobile device and a first accuracy metric based on a signal strength of the first wireless communication signal;
   determining a second candidate location of the mobile device and a second accuracy metric based on the second wireless communication signal, the second accuracy metric being of a different type from the first accuracy metric, where the second accuracy metric is associated with a feature of the second wireless communication signal other than signal strength;
   normalizing the first accuracy metric that is based on signal strength of the first wireless communication signal with the second accuracy metric of the different type from the first accuracy metric; and
   determining an estimated location of the mobile device based on the first candidate location, the normalized first accuracy metric, the second candidate location, and the normalized second accuracy metric, the estimated location being determined using a weighted average of the first candidate location and the second candidate location, where weights of the weighted average are based on the normalized first accuracy metric and the normalized second accuracy metric.

* * * * *